United States Patent
Lenkszus

(10) Patent No.: US 8,741,462 B1
(45) Date of Patent: Jun. 3, 2014

(54) KIT FOR REMOTE LOCATION OF SMOKE DETECTOR BATTERY

(71) Applicant: Donald John Lenkszus, Buckeye, AZ (US)

(72) Inventor: Donald John Lenkszus, Buckeye, AZ (US)

( * ) Notice: Subject to any disclaimer, the term of this patent is extended or adjusted under 35 U.S.C. 154(b) by 0 days.

(21) Appl. No.: 14/016,170

(22) Filed: Sep. 2, 2013

Related U.S. Application Data

(62) Division of application No. 13/136,837, filed on Aug. 12, 2011, now Pat. No. 8,541,124.

(51) Int. Cl.
*H01M 2/10* (2006.01)

(52) U.S. Cl.
USPC ............................................. 429/99; 429/100

(58) Field of Classification Search
None
See application file for complete search history.

(56) References Cited

U.S. PATENT DOCUMENTS 4,303,876 A * 12/1981 Kelly et al. ................... 320/110

* cited by examiner

*Primary Examiner* — Barbara Gilliam
*Assistant Examiner* — Stephan Essex
(74) *Attorney, Agent, or Firm* — Donald J. Lenkszus

(57) ABSTRACT

A kit is provided that provides for remotely locating a smoke detector battery from a surface mounted smoke detector of the type that comprises an internal two wire battery connector. The kit comprises a first connector arranged to mate with the internal two-wire battery connector. The kit also includes a length of surface mountable tape wire comprising at least two, flat, thin, flexible, elongate conductors carried by an insulating tape. A second connector is configured to connect the first pair of electrical wire conductors to the two elongate conductors. A container is provided for containing a smoke detector battery. The container comprises a pair of contacts for electrically connecting to a smoked detector battery. A third connector is provided to connect the container contacts to the elongate conductors. The container is mountable at a location on a wall surface to provide convenient access to the battery.

4 Claims, 6 Drawing Sheets

KIT FOR REMOTE LOCATION OF SMOKE DETECTOR BATTERY

FIELD OF THE INVENTION

The present invention relates to smoke detectors, in general, and to smoke detectors that utilize either battery power or back-up battery power, in particular.

BACKGROUND OF THE INVENTION

The importance and safety provided by residential and commercial smoke detectors is well known. Building codes typically mandate that smoke detectors be provided in residential and commercial structures.

Most state and local laws regarding the required number and placement of smoke detectors are based upon standards established in NFPA 72, National Fire Alarm and Signaling Code. The NFPA code requires smoke detectors on every habitable level and within the vicinity of all bedrooms.

Typically local building and fire codes require that smoke detectors be located high on walls or in many instances on the ceiling of the room in which the smoke detector is located.

Most residential smoke detectors run on 9-volt alkaline or carbon-zinc batteries. When these batteries run down, the smoke detector becomes inactive. Most smoke detectors will signal a low-battery condition. The alarm may chirp at intervals if the battery is low, though if there is more than one unit within earshot, it can be hard to locate. It is common, however, for houses to have smoke detectors with dead batteries. Because of the difficulty in replacing smoke detector batteries it is well known that many smoke alarms may have dead or removed batteries.

In new construction, minimum requirements are typically more stringent. All smoke detectors must be hooked directly to the electrical wiring, be interconnected and have a battery backup. In addition, smoke detectors are required either inside or outside every bedroom, depending on local codes. Some areas also require smoke detectors in stairways, main hallways and garages.

Even though smoke detectors are hooked up to electrical wiring, each such smoke detector includes a back-up smoke detector battery that can operate the detector in the event of a power outage. The back-up smoke detector battery is also most commonly a 9-volt battery having snap type battery terminals.

Because smoke detector batteries have a limited life, they must be periodically replaced.

A significant issue with smoke detectors is the inconvenience or difficulty involved in replacing the smoke detector battery. Because the smoke detector is located high on the wall or on the ceiling in a room, frequently a ladder must be used to perform the simple task of replacing the battery.

Still further, the smoke detector must be partially disassembled, the battery connector must be unsnapped from the battery snap terminals, a new battery snapped to the battery connector, and the smoke detector reassembled.

Although the process of replacing a battery is not complex, it typically is done while standing on a ladder. If the ladder is not tall enough, the person replacing the battery may perform the task at some risk.

Many people do not have a ladder, or the ladder is not tall enough to safely perform the task, or in the case of some senior citizens or those with physical infirmities or those who do not like to climb a ladder it is difficult, if not impossible to access the smoke detector to replace the battery.

Millions of smoke detectors have been sold and installed, and it is desirable to provide for easier replacement of smoke detector batteries and back-up smoke detector batteries.

Prior attempts to provide for remote smoke detector battery have required running wire above ceilings and/or within wall cavities to electrical utility boxes that are mounted like conventional electrical boxes extending into the wall stud cavity.

It is highly desirable to provide a kit for the remote locating of a smoke detector battery that does not require running wires in a ceiling or wall cavity.

SUMMARY OF THE INVENTION

In one embodiment of the invention, a kit is provided that provides for remotely locating a smoke detector battery from a surface mounted smoke detector of the type that comprises an internal two wire battery connector. The kit comprises a first connector arranged to mate with the internal two-wire battery connector. The first connector has a first pair of first electrical wire conductors extending there from. The kit also includes a length of surface mountable tape wire comprising at least two, flat, thin, flexible, elongate conductors carried by an insulating tape. One surface of the tape carries an adhesive layer or material bonded to the insulating tape. The cross-sectional area of the tape wire is such that the tape wire will be relatively inconspicuous when applied to a ceiling and/or wall. The tape wire is mountable to a flat surface or to adjacent flat surfaces such that said flat electrical conductors are mountable onto an interior wall surface, said wall surface being one of the same wall surface upon which said smoke detector is surface mounted or a wall surface adjacent to the surface upon which said smoke detector is surface mounted. A second connector is configured to connect the first pair of electrical wire conductors to the two elongate conductors. A container is provided for containing a smoke detector battery. The container comprises a pair of contacts for electrically connecting to a smoked detector battery. A third connector is provided to connect the container contacts to the elongate conductors. The container is mountable at a location on a wall surface to provide convenient access to the battery. The tape wire is trimmable such that the length between the first connector and third connector and container is selectably customizable.

In an embodiment a remote locatable smoke detector battery container can advantageously provide 9-volt battery voltage to a smoke detector. The 9 volts can be provided by using a 9-volt battery, or 6 AAA batteries, or 6 AA batteries, or a combination of a total of 6 AA and AAA batteries.

An embodiment of a smoke detector battery container comprises a first battery receptacle for receiving a 9-volt smoke detector battery and a first pair of contacts for establishing electrical connection to a 9-volt battery inserted into the first battery receptacle. The container also includes six pairs of second battery receptacles; each pair comprises a pair of second contacts. Each of the second receptacles is sized to receive one of an AA battery or an AAA battery. The container further includes first wiring connected to the first pair of contacts and second wiring connected to the second contacts of the six pairs of second receptacles. The second wiring is arranged such that when six batteries are inserted into the six pairs of second receptacles, said six batteries are connected in series. A connector has electrical connections to the first wiring and to the second wiring and has outputs coupleable to a smoke detector. The first battery receptacle and the pairs of second battery receptacles arranged such that when a 9 volt battery is received in the first battery receptacle, the first battery will prevent at least one battery from being received in one of the second battery receptacles.

In at least one embodiment, a smoke detector battery container also includes six pairs of third battery receptacles sized to receive AA batteries and the six pairs of second battery receptacles are sized to receive AAA batteries. The first battery receptacle is arranged relative to at least one of the second battery receptacles and said at least one of the third battery receptacles such that when a 9 volt battery is received in the first battery receptacle no AAA battery can be inserted into the at least one second battery receptacle and no AA battery can be inserted into the at least one third battery receptacle.

BRIEF DESCRIPTION OF THE DRAWING

The invention will be better understood from a reading of the following detailed description of various embodiments of the invention in conjunction with the attached drawing figures in which like reference designators are used to identify like elements, and in which the various elements are not drawn to scale and are intended to only be representative of the various elements and are not intended to provide any physical constraints to the invention, and in which.

DETAILED DESCRIPTION

Figure 1:
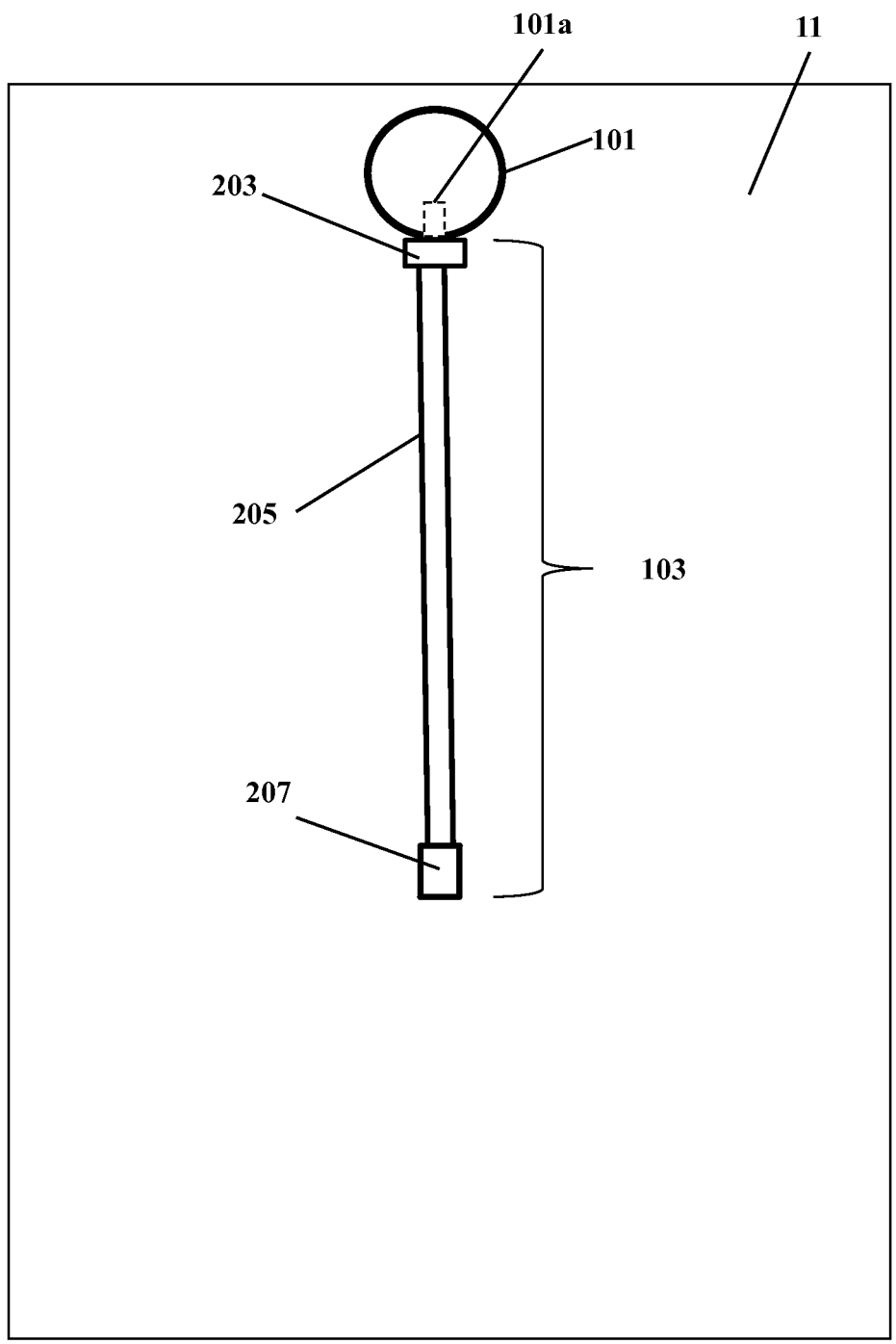
FIG. 1 illustrates smoke detector installation.

FIG. 1 illustrates a typical representative smoke detector installation 1 to which a kit in accordance with the principles of the invention advantageously applies.

Installation 1 includes a conventional smoke detector 101 mounted near the top of a wall of 100 on surface 11. Smoke detector 101 includes a battery compartment 101a, which is adapted to receive a smoke detector battery, e.g., a 9-volt battery. Battery compartment 101a includes a connector having conventional snap terminals for connection to a 9-volt battery. In accordance with the principles of the invention, a 9-volt battery is not inserted into battery compartment 101a.

A kit 103 is provided to locate the smoke detector battery at a remote location that provides for more convenient access for battery replacement. Kit 103 comprises a first connector 201 shown more clearly in FIGS. 2 and 3, a second connector 203, tape wire 205 and a smoke detector battery container 207 that is remotely located at a convenient height.

Figure 2:
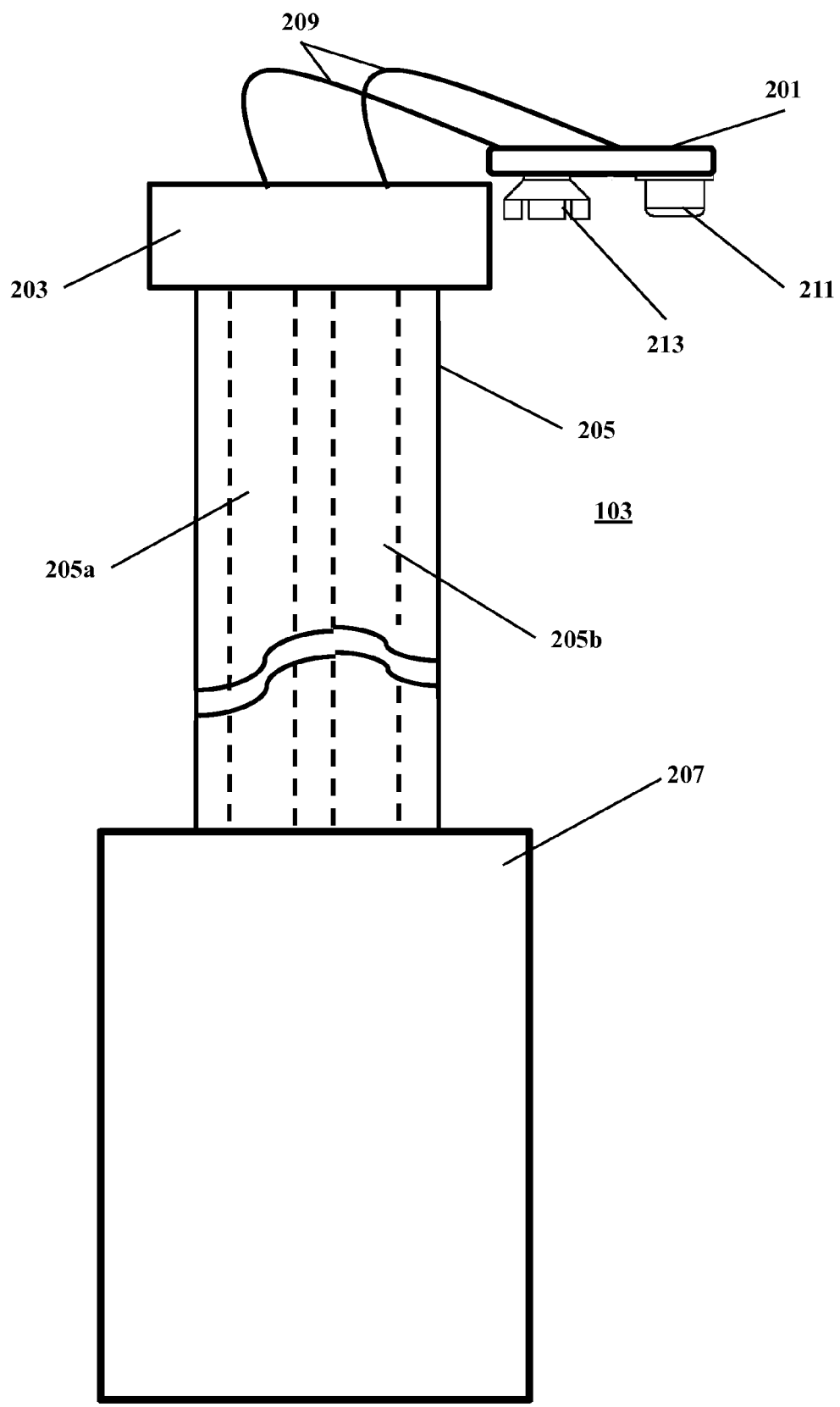
FIG. 2 illustrates a first embodiment.

In the embodiment of FIG. 2, second connector 203 makes a connection from a two-conductor tape wire to a pair of conductors 209 that terminate at first connector 201. First connector 201 includes a pair of snap connectors 211, 213 that are selected to mate with the snap connectors or smoke detector battery connectors contained in smoke detector 101 in FIG. 1.

Second connector 203 establishes a conductive paths between a pair of elongate, flat conductors 205a, 205b of tape wire 205 and round wire conductors 209 that are connected to first connector 201.

Figure 3:
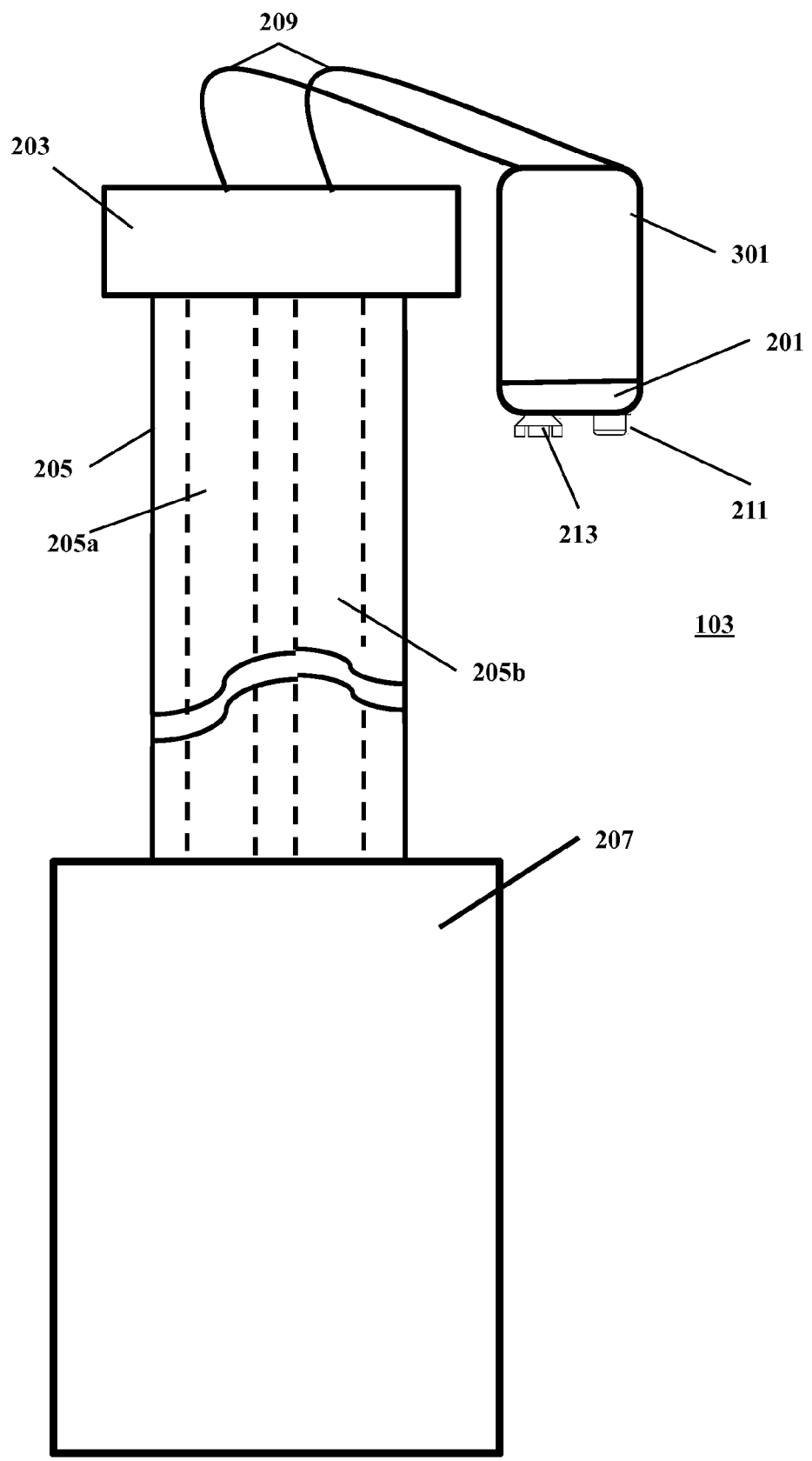
FIG. 3 illustrates a second embodiment.

In the embodiment of FIG. 3, second connector 203 makes a connection from a two-conductor tape wire to a pair of conductors 209 that terminate at first connector 201. First connector 201 includes a pair of snap connectors 211, 213 that are selected to mate with the snap connectors or smoke detector battery connectors contained in smoke detector 101 in FIG. 1. In addition, a dummy battery body 301 is provided. In many smoke detectors, a switch is provided in battery compartment 101a to detect the absence of a smoke detector battery. By providing dummy battery body, smoke detector 101 operates as if the smoke detector battery is in place.

Figure 7:
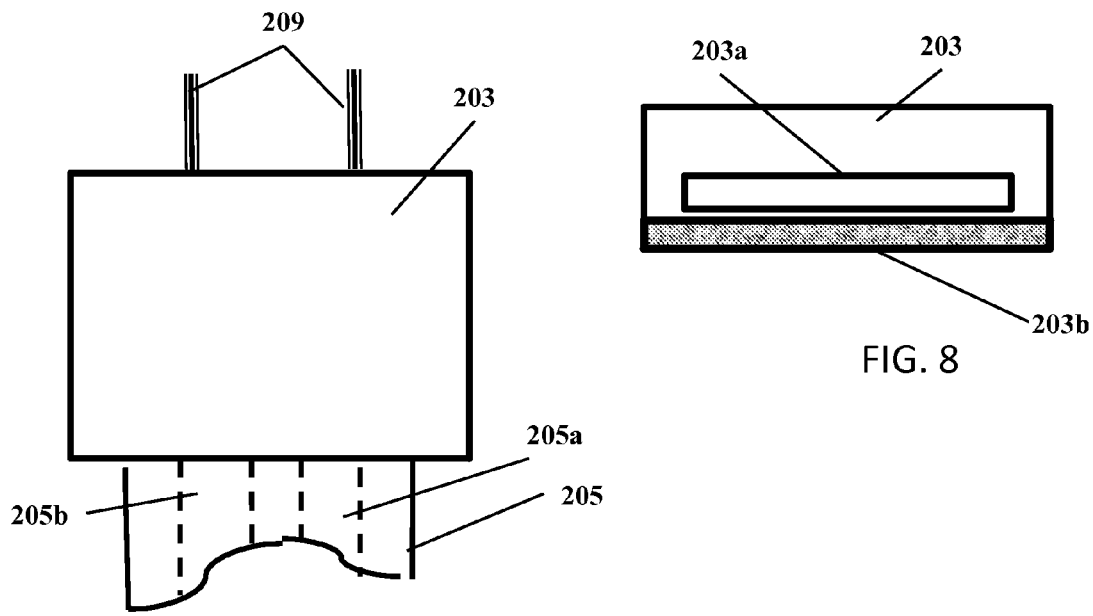
FIG. 7, which is found on the same drawing sheet as FIG. 4, is a top view of a connector.
Figure 8:
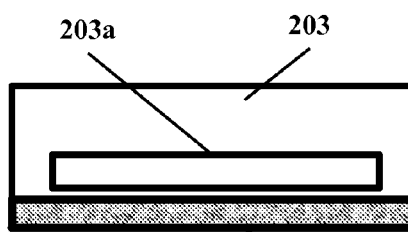
FIG. 8, which is found on the same drawing sheet as FIG. 4, is an end view of the connector of FIG. 7.

Connector 203 is shown in greater detail in FIGS. 7 and 8. As clearly shown in FIG. 8. connector 203 includes an aperture 203a into which tape wire 205 extends. Connector 203 provides a connection between tape wire 205 and conductors 209.

Advantageously, connector 203 includes an adhesive layer 203b on its bottom surface. By providing adhesive layer 203b, connector 203 may easily be affixed to surface 11 of wall 1.

Figure 4:
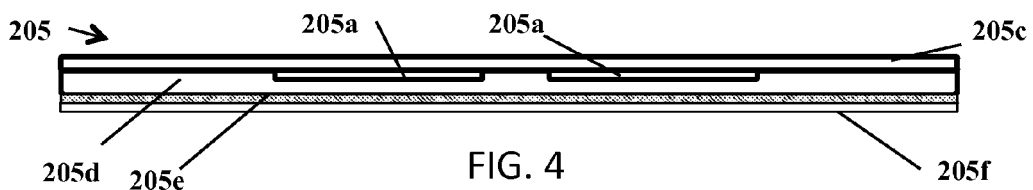
FIG. 4 is an illustrative cross-section of a tape wire.

Turning now to FIG. 4 tape wire 205 is shown in cross-section. Tape wire 205 comprises the two conductors 205a, 205b that are typically metallic foil such as copper. Conductors 205a, 205b are carried by a thin insulating top layer 205c which may, for example, be a material such as Mylar. Typically conductors 205a, 205b, are covered on the bottom side by another insulating layer, again which may, for example, be Mylar. In the embodiment shown in FIG. 4, the bottom surface tape wire 205 is covered by an adhesive layer 205e that is provided with a removable layer 205f. By peeling layer 205f off adhesive layer 205e, tape wire 205 may be easily affixed to surface 11 of a wall 1 or a ceiling.

In other embodiments adhesive layer 205e and removable layer 205f are not provided, but rather a spray adhesive may be applied to either the bottom surface of tape wire 205 or to the surface to which tape wire 205 is to be affixed.

Tape wire 205 is constructed to have a cross-sectional thickness such that the tape wire will blend in with the surface to which it is affixed when painted or after wallpaper is applied or tape and joint compound is applied.

The two conductors 205a, 205b are generally on the order of about 0.002 inches thick, but may range from about 0.0004 to 0.20 inches. It is understood that the various dimensions described herein may vary considerably within the practice of the invention.

Insulating layer 205c can be composed of materials selected from the group consisting of polyester films (e.g., Mylar), urethane films or other insulating films. The adhesive material used for adhesive layer 205e can be an adhesive tape, liquid adhesive, or a combination of the two.

Tape wire 205 is a surface mounted, flat, flexible plurality of elongate conductors. Tape wire 205 may be of any convenient length.

In kit 103, tape wire 205 is provided as a predetermined fixed length that may be cut to a desired length.

Figure 6:
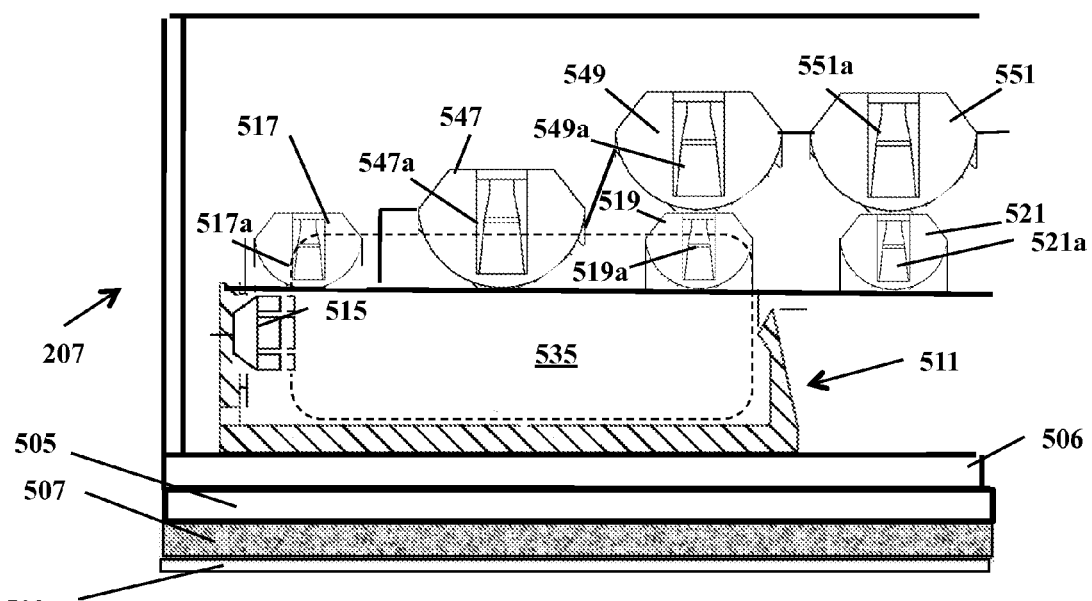
FIG. 6, which is found on the same drawing sheet as FIG. 4, is a cross-section of a portion of the container of FIG. 5 along lines 5-5.
Figure 5:
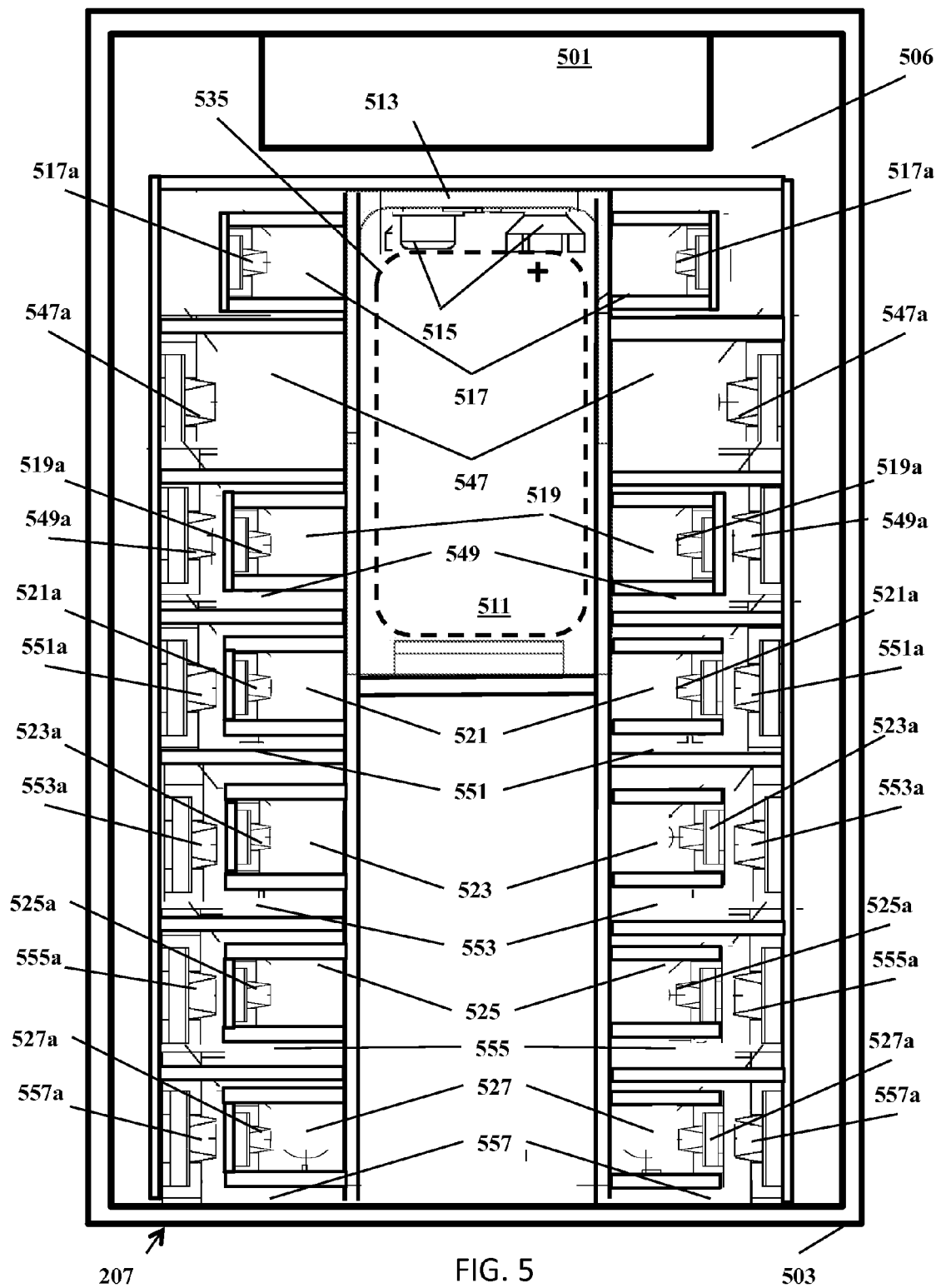
FIG. 5 a view of a smoke detector battery container with cover removed.

Turning now to FIGS. 5, and 6 one embodiment of smoke detector battery container 207 is shown. The cover of container 207 is not shown, however, it will be understood by those skilled in the art that various configurations of a cover may be utilized. Container 207 comprises sidewalls 503 and bottom wall 505. The outer surface of bottom wall 505 carries an adhesive layer 507. Adhesive layer 507 can be an adhesive tape, liquid adhesive or a combination of both. Adhesive layer 507 is covered by a removable layer 509. By removing layer 509, adhesive layer 507 is exposed and container 207 may be affixed to a wall surface at a convenient location as shown in FIG. 1.

Smoke detector battery container 207, includes a third connector 501 and a 9-volt battery holder 511. 9-volt battery holder 511 carries a fourth connector 513 that carries snap connectors 515. Electrical connections are provided from snap connectors 515 to third connector 501. Third connector 501 provides electrical connection between snap connectors 515 and conductors 205a, 205b tape wire 205. Third connector 501 is constructed similar to second connector 203.

In the embodiment of FIGS. 5 and 6, battery container 207 also includes six pairs of AAA battery holders 517, 519, 521, 523, 525, 527 each having battery contacts 517a, 519a, 521a, 523a, 525a, 527a.

Figure 9:
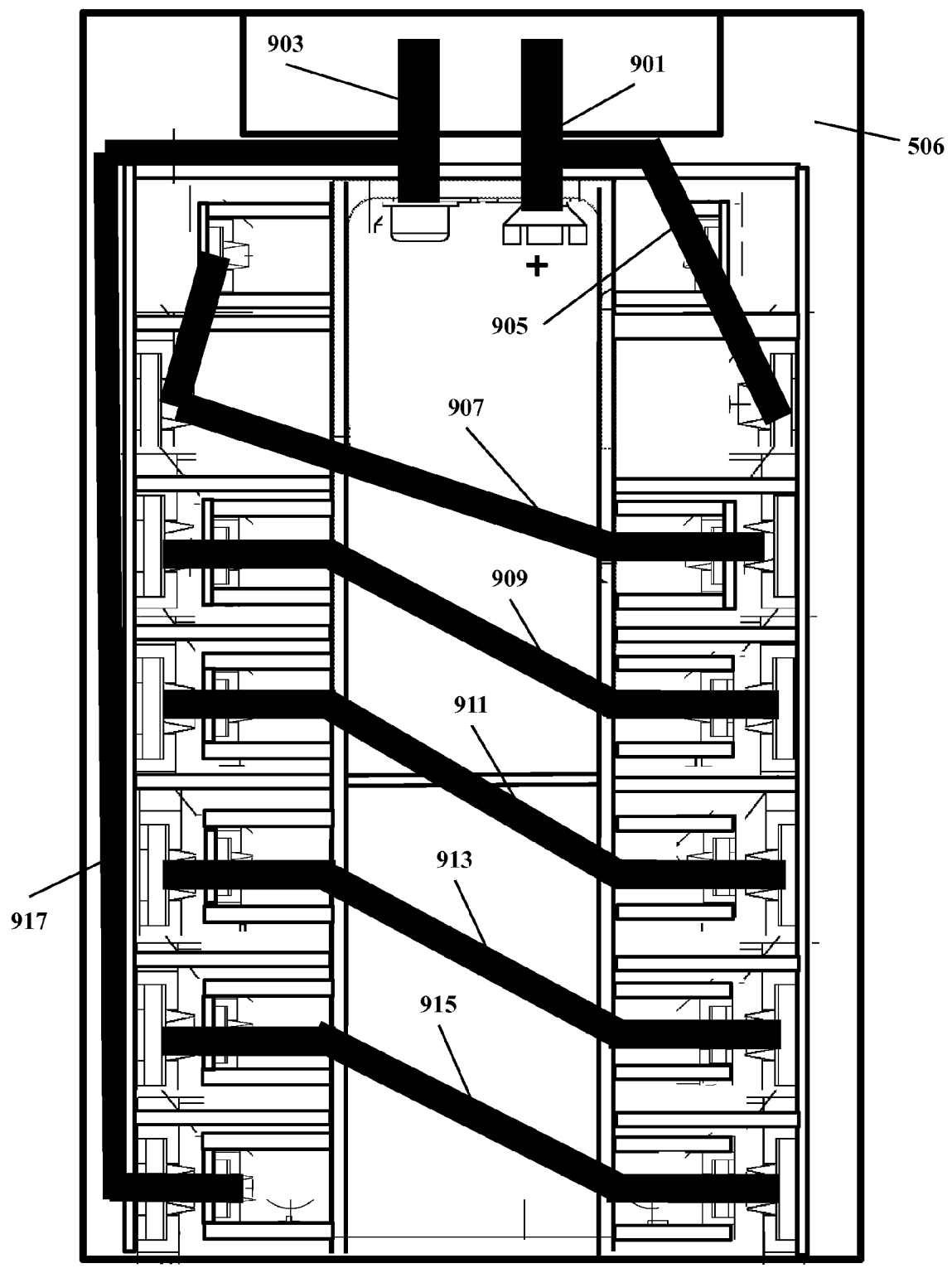
FIG. 9 illustrates wiring connections for the container of FIG. 5.

A printed wiring board 531 is provided in smoke detector battery container 207. FIG. 9 illustrates conductive paths 901, 903 that connect 9-volt battery snap connectors 515 to third connector 501. In addition conductive paths 905, 907, 909, 911, 913, 915, 917 are provided to serially connect AAA batteries retained in AAA battery holders 517, 519, 521, 523, 525, 527 and to connect the serially connected AAA batteries in parallel with conductors 901, 903.

Conductive paths 901, 903, 905, 907, 909, 911, 9013, 915, 917 are carried on a printed circuit board 506 positioned in the bottom of smoke battery container 207. It will be apparent to those skilled in the art that conductive paths 901, 903, 905, 907, 909, 911, 9013, 915, 917 may be provided by direct wiring or printed circuit or any combination of the two.

When a 9 volt battery, shown in phantom as battery 535, is inserted into battery holder 511, it is not possible to insert an AAA battery into holders 517, 519. When a 9-volt battery 535 is not inserted into battery holder 511, AAA batteries may be inserted into each of the AAA battery holders 517, 519, 521, 523, 525, 527. The serially connected batteries provide a 9-volt output to third connector 501.

Battery container 207 also includes six pairs of AA battery holders 547, 549, 551, 553, 555, 557 each having battery contacts 557a, 559a, 551a, 553a, 555a, 557a. AA battery holder 547 is positioned adjacent to and along side AAA battery holder 517, and its battery contacts 547a are connected in parallel with battery contacts 517a by conductive paths 905, 907. AA battery holder 549 is positioned adjacent to AAA battery holder 519, and its battery contacts 549a are connected in parallel with battery contacts 519a by conductive path 907, 909. AA battery holder 551 is positioned adjacent to AAA battery holder 521, and its battery contacts 551a are connected in parallel with battery contacts 521a by conductive path 909, 911. AA battery holder 553 is positioned adjacent to AAA battery holder 523, and its battery contacts 553a are connected in parallel with battery contacts 523a by conductive path 911, 913. AA battery holder 555 is positioned adjacent to AAA battery holder 525, and its battery contacts 555a are connected in parallel with battery contacts 525a by conductive path 913, 915. AA battery holder 557 is positioned adjacent to AAA battery holder 527, and its battery contacts 557a are connected in parallel with battery contacts 527a by conductive path 915, 917.

AA battery holder 547 is positioned to the side of AAA battery holder 517 and above battery holder 511. When a 9-volt battery, shown in phantom as battery 535, is inserted into battery holder 511, it is not possible to insert an AA battery into holder 547, nor is it possible to insert an AAA battery into holder 517. When a 9-volt battery 535 is not inserted into battery holder 511, an AA battery may be inserted into battery holder 547 and or to connect an AAA battery into battery holder 517. The serially connected batteries provide a 9-volt output to third connector 501.

One feature of the embodiment is that the AAA battery holders 519, 521, 523, 525, 527 are positioned relative to AA battery holders 549, 551, 553, 555, 557 such that if an AAA battery is inserted into any one of the AAA battery holders 519, 521, 523, 525, 527, an AA battery cannot be inserted into the corresponding one of the AA battery holders 549, 551, 553, 555, 557.

With the structure described above, remote locatable smoke detector battery container 207 can advantageously provide 9-volt battery voltage to a smoke detector 101. The 9 volts can be provided by using a 9 volt battery, or 6 AAA batteries, or 6 AA batteries, or a combination of a total of 6 AA and AAA batteries that. In the event that a 9 volt battery is inserted into the smoke detector battery container 207, it is not possible to utilize any AA or AAA batteries to provide voltage to smoke detector 101.

Because AA and AAA batteries have more energy capacity than a 9-volt battery, it is entirely likely that the batteries will not have to be replaced as often as a 9-volt battery. In addition, by allowing use of 9 volt, AA and AAA batteries, in a convenient location, it is more likely that there will be batteries available to provide power to a smoke detector.

The invention has been described in terms of illustrative embodiments. It will be apparent to those skilled in the art that various changes and modifications can be made to the illustrative embodiments without departing from the spirit or scope of the invention. It is intended that the invention include all such changes and modifications. It is also intended that the invention not be limited to the illustrative embodiments shown and described. It is intended that the invention be limited only by the claims appended hereto.

The invention claimed is:

1. A smoke detector battery container, comprising:
a first battery holder for receiving a 9-volt smoke detector battery;
a first pair of contacts for establishing electrical connection to a 9-volt battery inserted into said first battery holder;
first wiring connected to said first pair of contacts;
six pairs of second battery receptacles, each pair of said second battery holders and third battery holders, each of said second battery holders comprising a pair of second contacts and sized to receive AAA batteries, each of said third battery holders comprising a pair of third contacts and sized to receive AA batteries;
second wiring connected to said second contacts of said second battery holders and to said third contacts of said third battery holders, said second wiring connecting each one of said pair of third contacts in parallel with a corresponding pair of second contacts such that each pair of third contacts in parallel with each corresponding pair of second contacts, and such that when six batteries are inserted into said six pairs of second battery holders and third battery holders, said six batteries are connected in series; and
said first battery holder and said pairs of second battery holders and third battery holders arranged such that when a 9 volt battery is received in said first battery holder, at least one, and not more than three, of said pairs of second battery holders and third battery holders cannot receive its corresponding battery.

2. A smoke detector battery container in accordance with claim 1, comprising:
a back wall;

an adhesive layer carried on said back wall, said adhesive layer being used to surface mount said smoked detector battery container.

3. A smoke detector battery container in accordance with claim 1, comprising:

a tape wire connector, said tape wire connector connected to said first wiring and said second wiring and connectable to a tape wire.

4. A smoke detector battery container in accordance with claim 1, comprising:

electrical connection between said first wiring and said second wiring such that said first wiring and said second wiring are connected in parallel.

\* \* \* \* \*